(12) United States Patent
Anantharaman et al.

(10) Patent No.: US 12,425,297 B2
(45) Date of Patent: *Sep. 23, 2025

(54) DYNAMIC OPERATING ROLES FOR INTERNET OF THINGS (IOT) DEVICES IN A NETWORK

(71) Applicant: QUALCOMM Incorporated, San Diego, CA (US)

(72) Inventors: Subramanian Anantharaman, Chennai (IN); Sreekanth Natarajan, Chennai (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/806,720

(22) Filed: Jun. 13, 2022

(65) Prior Publication Data

US 2022/0376977 A1    Nov. 24, 2022

Related U.S. Application Data

(63) Continuation of application No. 15/951,135, filed on Apr. 11, 2018, now Pat. No. 11,368,363.

(30) Foreign Application Priority Data

May 26, 2017    (IN) .............................. 201741018541

(51) Int. Cl.
*H04L 41/0816*    (2022.01)
*H04L 12/28*    (2006.01)
(Continued)

(52) U.S. Cl.
CPC ...... *H04L 41/0816* (2013.01); *H04L 12/2807* (2013.01); *H04L 12/283* (2013.01);
(Continued)

(58) Field of Classification Search
None
See application file for complete search history.

(56) References Cited

U.S. PATENT DOCUMENTS 8,364,148 B2    1/2013    Dravida et al.
8,488,562 B2    7/2013    Nagaraja
(Continued)

FOREIGN PATENT DOCUMENTS

CN    103262632 A    8/2013
CN    204707282 U    10/2015
(Continued)

OTHER PUBLICATIONS

"PCT Application No. PCT/US2018/27910 International Search Report and Written Opinion", Jun. 14, 2018, 12 pages.
(Continued)

*Primary Examiner* — Tonia L Dollinger
*Assistant Examiner* — Ishrat Rashid
(74) *Attorney, Agent, or Firm* — Holland & Hart LLP/Qualcomm

(57) ABSTRACT

This disclosure provides systems, methods and apparatus, including computer programs encoded on computer storage media, for an internet of things (IoT) device. In some implementations, the IoT device can select an operating role for the first IoT device in a local network. The operating role may be selected from between an endpoint role and a relay role. The operating role may be dynamically selected by the first IoT device based whether the relay role would enhance connectivity for a client device that is within a wireless range of the first IoT device. The IoT device may participate in a self-organizing network (SON) and may coordinate with other devices in the SON to enhance wireless coverage for the client device based on a position of the client device relative to the one or more IoT devices.

32 Claims, 7 Drawing Sheets

(51) Int. Cl.
*H04L 41/00* (2022.01)
*H04L 41/08* (2022.01)
*H04W 84/18* (2009.01)

(52) U.S. Cl.
CPC ...... *H04L 12/2832* (2013.01); *H04L 12/2838* (2013.01); *H04L 41/0886* (2013.01); *H04L 41/30* (2013.01); *H04W 84/18* (2013.01)

(56) References Cited

U.S. PATENT DOCUMENTS

| | | | |
|---|---|---|---|
| 8,855,138 | B2 | 10/2014 | Horn et al. |
| 9,107,092 | B2 | 8/2015 | Agarwal et al. |
| 9,264,960 | B1* | 2/2016 | Tailor ................ H04W 36/0083 |
| 9,351,143 | B2 | 5/2016 | Barany et al. |
| 9,642,040 | B2 | 5/2017 | Ho et al. |
| 10,149,335 | B2 | 12/2018 | Gujral et al. |
| 11,368,363 | B2 | 6/2022 | Anantharaman et al. |
| 2003/0188006 | A1* | 10/2003 | Bard .................... H04W 84/20 709/223 |
| 2010/0111055 | A1* | 5/2010 | Chiu .................... H04W 24/02 370/338 |
| 2012/0057456 | A1* | 3/2012 | Bogatin ................ H04W 4/80 370/230.1 |
| 2012/0250545 | A1 | 10/2012 | Papadogiannis et al. |
| 2013/0083722 | A1* | 4/2013 | Bhargava ............. H04W 52/46 455/10 |
| 2014/0348061 | A1 | 11/2014 | Salkintzis |
| 2015/0023336 | A1 | 1/2015 | Ilsar et al. |
| 2015/0339917 | A1 | 11/2015 | Messing |
| 2016/0036908 | A1 | 2/2016 | Aggarwal et al. |
| 2016/0128043 | A1 | 5/2016 | Shuman et al. |
| 2016/0134463 | A1 | 5/2016 | Bellizia et al. |
| 2016/0191315 | A1* | 6/2016 | Van Oost ............ H04L 41/0856 709/221 |
| 2016/0227461 | A1 | 8/2016 | Li et al. |
| 2016/0373325 | A1* | 12/2016 | Shanks ................ H04L 43/028 |
| 2017/0013228 | A1 | 1/2017 | Kalendra et al. |
| 2017/0063999 | A1* | 3/2017 | Adrangi .............. H04W 12/037 |
| 2017/0188266 | A1 | 6/2017 | Tian et al. |
| 2017/0201504 | A1* | 7/2017 | Funk .................... H04L 63/0471 |
| 2017/0265187 | A1 | 9/2017 | Chen et al. |
| 2018/0139796 | A1 | 5/2018 | Beijar et al. |
| 2018/0184422 | A1* | 6/2018 | Cavalcanti ........ H04W 72/0446 |
| 2018/0343165 | A1 | 11/2018 | Anantharaman et al. |

FOREIGN PATENT DOCUMENTS

| | | |
|---|---|---|
| CN | 107113689 | 8/2017 |
| CN | 107637162 A | 1/2018 |
| KR | 20130093584 A | 8/2013 |
| WO | WO-2007008572 | 1/2007 |
| WO | WO-2010027821 | 3/2010 |
| WO | WO-2011075704 | 6/2011 |
| WO | 2011153507 | 12/2011 |
| WO | WO-2011153269 A1 | 12/2011 |
| WO | WO-2015161903 A1 | 10/2015 |
| WO | WO-2015179031 A1 | 11/2015 |
| WO | WO-2016018675 A1 | 2/2016 |
| WO | WO-2016044724 | 3/2016 |
| WO | WO-2016070106 A1 | 5/2016 |
| WO | WO-2016076986 A1 | 5/2016 |
| WO | 2016182597 | 11/2016 |
| WO | WO-2016182597 A1 * | 11/2016 ............ H04W 4/023 |

OTHER PUBLICATIONS

Athreya, et al., "Network Self-Organization in the Internet of Things", Sensor, Mesh and Ad Hoc Communications and Networks (SECON), 2013 10th Annual IEEE Communications Society Conference, Jun. 24-27, 2013, 9 pages.

Behzadan, et al., "A Game-Theoretic Model for Analysis and Design of Self-Organization Mechanisms in IoT", Jan. 17, 2017, 14 pages.

* cited by examiner

DYNAMIC OPERATING ROLES FOR INTERNET OF THINGS (IOT) DEVICES IN A NETWORK

CROSS-REFERENCE TO RELATED APPLICATIONS

This Patent Application is a Continuation of U.S. patent application Ser. No. 15/951,135, filed Apr. 11, 2018, entitled "DYNAMIC OPERATING ROLES FOR INTERNET OF THINGS (IOT) DEVICES IN A NETWORK", which claims priority to Indian Provisional Patent Application No. 201741018541, filed May 26, 2017, entitled "INTERNET OF THINGS (IOT) NETWORK-EDGE DEVICES IN SELF-ORGANIZING NETWORKS (SON)," and assigned to the assignee hereof. The disclosure of the prior Applications are considered part of and are incorporated by reference in this Patent Application.

TECHNICAL FIELD

This disclosure generally relates to the field of communication, and more particularly to internet of things (IoT) devices in a communication network.

DESCRIPTION OF THE RELATED TECHNOLOGY

Internet of things (IoT) refers to network enablement of devices that were not traditionally intended to operate in a network. Examples of IoT devices include cameras, drones, wearable devices, home appliances, lighting systems, security system components, speakers, smart refrigerators, televisions, and the like. For example, IoT devices may include "smart" appliances which allow an operator to control or automate operation of the appliance. Some IoT devices are data-consuming or data-producing devices which may be added to a local network. A local network may include one or more access points (AP) that provide connectivity to the local network. There may be opportunities to enhance connectivity as a result of adding IoT devices to the local network.

SUMMARY

The systems, methods, and devices of this disclosure each have several innovative aspects, no single one of which is solely responsible for the desirable attributes disclosed herein.

One innovative aspect of the subject matter described in this disclosure can be implemented as a method performed by a first internet of things (IoT) device. The first IoT device may establish a first communication link between the first IoT device and a first network node of a local network. The first IoT device may select an operating role for the first IoT device in the local network. The operating role may be selected from between an endpoint role and a relay role. The operating role may be dynamically selected by the first IoT device based, at least in part, on a determination whether the relay role would enhance connectivity for a client device that is within a wireless range of the first IoT device. Upon selecting the relay role, the first IoT device may establish a second communication link via a wireless association between the first IoT device and the client device. The first IoT device may bridge traffic associated with the client device via the first communication link and the second communication link.

In some implementations, the first IoT device may change the operating role of the first IoT device from the endpoint role to the relay role. The first IoT device may configure itself to operate as a relay node between the first network node and the client device. The first IoT device may bridge the traffic in response to changing the configuration of the first IoT device to operate as the relay node.

In some implementations, the local network is a self-organizing network (SON). Selecting the operating role may include communicating with a second IoT device utilizing a SON protocol.

In some implementations, the first IoT device may coordinate between the first IoT device and one or more other IoT devices in the local network to select the relay role for the first IoT device based, at least in part, on a position of the client device relative to the first IoT device and the one or more other IoT devices.

In some implementations, the first IoT device may send, from the first IoT device to one or more network nodes of the local network, a message indicating that the first IoT device is capable of operating in the relay role for the local network.

In some implementations, the first IoT device may broadcast an advertisement message indicating that the first IoT device is capable of operating in the relay role for the local network. The first IoT device may receive a request from the client device for the wireless association between the first IoT device and the client device. The first IoT device may select the relay role in response to receiving the request from the client device.

In some implementations, the first IoT device may determine to steer the client device from the first IoT device to a second network node in the local network. The first IoT device may steer the client device to the second network node.

In some implementations, the second network node may be a second IoT device connected to the local network.

In some implementations, the first IoT device may determine a first link metric for the first communication link between the first IoT device and a central access point of the local network. The first IoT device may determine a second link metric for a third communication link between the second network node and the central access point. The first IoT device may determine that the second network node would provide a higher quality of service for the client device based, at least in part, on a comparison of the first link metric and the second link metric.

In some implementations, the first IoT device may, after steering the client device to the second network node, reduce power for a wireless coverage area associated with the first IoT device.

In some implementations, the first IoT device may, after steering the client device to the second access point, determine that no client devices are using the relay role of the first IoT device for bridging traffic to the local network. The first IoT device may change the operating role of the first IoT device from the relay role to the endpoint role. The first IoT device may configure itself to operate as an endpoint in the local network.

In some implementations, the first IoT device may enable a wireless interface of the first IoT device in response to a request received via the first communication link between the first IoT device and the local network, and utilize the wireless interface to obtain diagnostic measurements associated with at least one other device in the local network.

Another innovative aspect of the subject matter described in this disclosure can be implemented in a first IoT device. The first IoT device may establish a first communication link between the first IoT device and a first access point of a local network. The first IoT device may initially be configured to operate as an endpoint connected to the local network. The first IoT device may establish a second communication link via a wireless association between the first IoT device and a client device. The first IoT device may bridge traffic associated with the client device via the first communication link and the second communication link.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
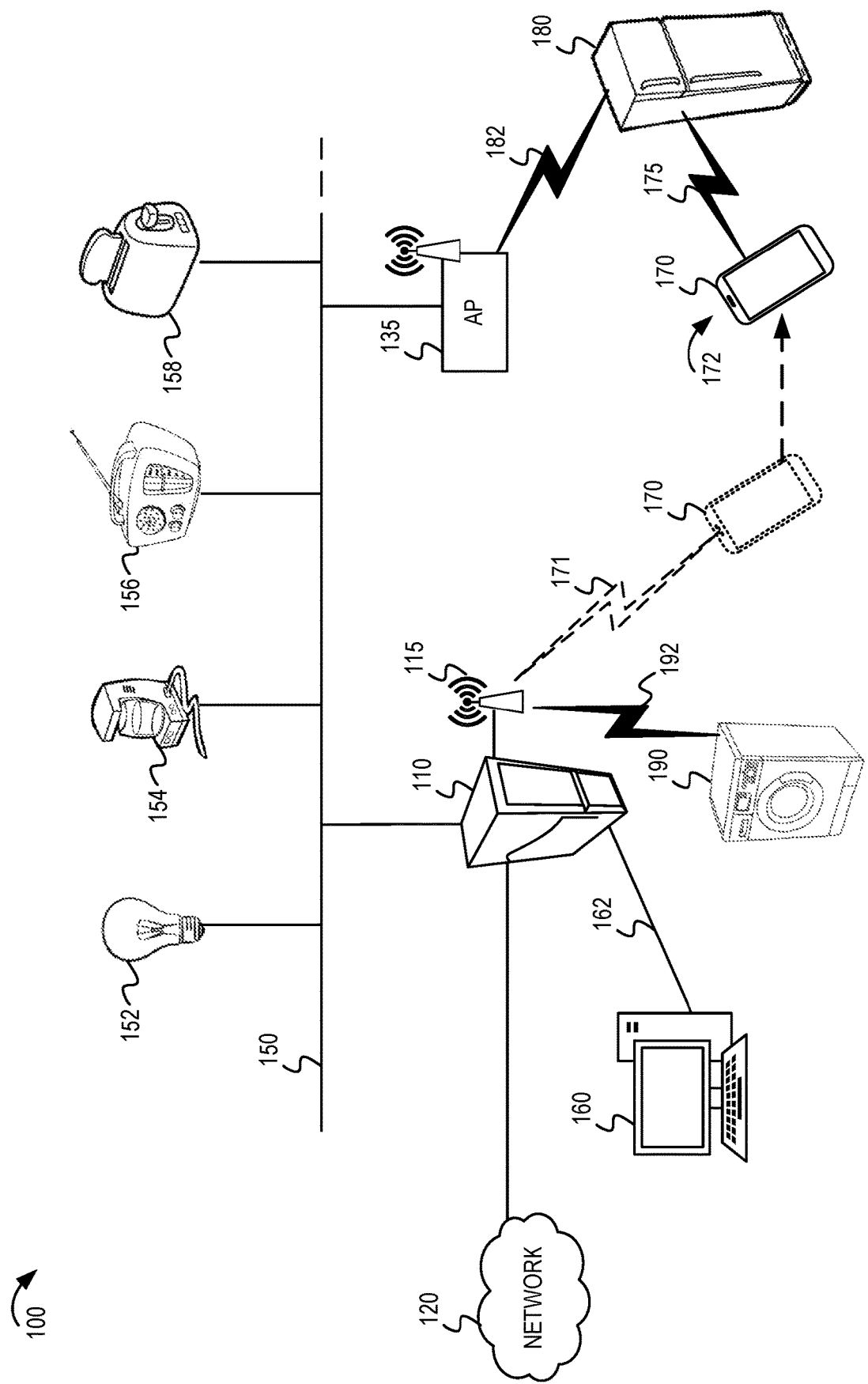
FIG. 1 shows a system diagram of an example local network including internet of things (IoT) devices and client devices.

The following description is directed to certain implementations for the purposes of describing the innovative aspects of this disclosure. However, a person having ordinary skill in the art will readily recognize that the teachings herein can be applied in a multitude of different ways. Some examples in this disclosure may be based on wireless local area network (WLAN) communication according to the Institute of Electrical and Electronics Engineers (IEEE) 802.11 wireless standards. However, the described implementations may be implemented in any device, system or network that is capable of transmitting and receiving radio frequency (RF) signals according to any communication standard, such as any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as a system utilizing 3G, 4G or 5G, or further implementations thereof, technology.

A local network in a home, apartment, business, or other area may include a variety of devices that utilize the local network to communicate with each other or with devices in another network. For example, the local network may provide access for local devices to communicate to an upstream network (such as access to the Internet, via a broadband network). The local network may include one or more access points (APs) to provide wireless coverage for the local network. Typically, one of the APs will be referred to as a root AP, while other APs make automatic path or routing selection using a logical topology between each of the other APs and the root AP. A local network which is capable of coordinating between two or more APs to manage a topology or aggregate wireless coverage area may be referred to as a self-organizing network (SON). A SON protocol may be used between the two or more APs to coordinate wireless channel configurations or other implementation settings.

There are several types of devices that may operate in the local network. For example, the local network may include one or more access points, client devices, and IoT devices. Examples of client devices may include mobile devices, laptops, computers, or wearable computing devices. Examples of IoT devices may include appliances, sensors, or other machines which are capable of communication via the local network and which perform other traditional machine functions. In some implementations, the IoT devices may not have been previously network-enabled. IoT devices may be data-consuming or data-producing devices and may operate as an endpoint connected to the local network. For example, the IoT device may be configured as a station (STA) connected to an AP. When operated as a STA, the IoT device may be operating in an endpoint role in the network. However, some IoT devices may be capable of operating in a relay role in the local network. In the relay role, an IoT device may provide wireless connectivity (as an AP) for a client device and relay traffic to or from the client device and an upstream connection to the local network.

In this disclosure, an IoT device may change its operating role based on a determination of whether the relay role would enhance connectivity for a client device that is within a wireless range of the IoT device. In one operating role (such as the "endpoint role"), the IoT device may operate as an endpoint in the network. In another operating role (such as the "relay role"), the IoT device may operate as a relay node between a client device and the local network. For example, the IoT device can operate as an AP or repeater in the SON and provide wireless access for a client device. The IoT device can bridge traffic to or from the client device and another access node (such as the central access point or another access point) of the network. In some implementations, the IoT device can utilize the SON protocol to communicate and coordinate with other APs (or other IoT devices) in the local network to optimize wireless coverage for the local network or to manage steering of the client device between APs. In some implementations, each IoT device may independently and dynamically select an operating role for itself.

In one aspect, an IoT device may advertise a capability to operate in the relay role. A client device may send a request to the IoT device to establish a wireless association between the client device and the IoT device. Thus, the client device may stimulate the IoT device to select the relay role. In response to receiving the request for the wireless association, the IoT device may change from an endpoint role to the relay role. In this scenario, the capability of the client device and the proximity of the client device to the IoT device may be factors which influence the operating role selection of the IoT device.

In one aspect, an IoT device may coordinate with one or more other IoT devices in the local network. A selection of which IoT device to use the relay role may be based on a position (or movement) of the client device relative to the IoT devices. For example, when the client device is proximately close to an IoT device, that IoT device may change to the relay role to provide wireless connectivity to the client device. As the client device moves throughout a location, different IoT devices may change to the relay role to provide seamless wireless coverage for the client device. When there are no client devices proximately close to an IoT device (or not using the IoT device), the IoT device may change to an endpoint role to conserve power and reduce wireless interference.

In one aspect, an IoT device may temporarily provide a diagnostic role in the local network. In the diagnostic role, the IoT device may enable a wireless interface to obtain diagnostic measurements associated with at least one other device in the local network. For example, the IoT device may conduct measurements regarding the wireless environment or regarding another device coupled to the local network. The diagnostic role may be used for troubleshooting or maintenance of other devices. For example, diagnostic information (such as automated diagnostic reports) can be sent to a server in an upstream network (such as a service provider host in the cloud). The diagnostic information may be used for analytics of the other IoT device or for optimizing the SON network.

Particular implementations of the subject matter described in this disclosure can be implemented to realize one or more of the following potential advantages. For example, wireless coverage of the local network can be extended in places where IoT devices are deployed. A client device may enjoy better wireless coverage or quality of service as a result of the IoT device operating as a relay node for the client device. Furthermore, IoT devices may coordinate using a SON protocol to manage or adapt configurations of their coverage areas and thus provide more complete wireless coverage for a client device in the local network. Additionally, an IoT device could be used for diagnostic measurements of another IoT device or AP in the network. In some implementations, integration of the IOT devices to a SON may improve the range and coverage of the SON within a connected home. In addition, traffic separation and quality of service (QoS) policies can be integrated into this service to route packets between a combination of SON network nodes and IOT devices depending on QoS and latency requirements of specific applications.

FIG. 1 shows a system diagram of an example local network including internet of things (IoT) devices and client devices. The network 100 includes central access point 110 which provides access for the local network to a broadband network 120. A gateway device (not shown) may provide access between the local network and the broadband network 120. For example, the gateway device can couple to the broadband network 120 through a cable, a fiber optic, a powerline, Ethernet, or digital subscriber line (DSL) network connection. A central access point 110 (sometimes also referred to as a central AP, CAP, or root AP) in the local network may route traffic between the local network and the gateway device. In some implementations, the central access point may be integrated or collocated with the gateway device. There may be multiple access points in the local network. Each AP in the local network may have different hardware capabilities (such as 2.4 GHz or 5 GHz support, dual-band single radio, dual band dual concurrent radios (DBDC), or the like) that may provide different options for wireless coverage. Typically, each AP utilizes one or more channels within a frequency band. A channel may refer to a frequency (or range) used by the AP to communicate with devices that have a wireless association with the AP. Similarly, client devices and IoT devices utilize the channel to communicate (via a wireless association) with the AP.

The central access point 110 may be considered a first AP 115 (or may include the first AP 115) which provides a wireless coverage area for client devices and IoT devices. For example, a washing machine 190 is an example of an IoT device and has a wireless communication link 192 to the first AP 115. A client device 170 (such as a mobile phone) may initially have a wireless communication link 171 to the first AP 115. The central access point 110 also may provide wireline access for devices in the network 100. In the example of FIG. 1, the central access point 110 has an Ethernet connection 162 to a desktop computer 160 and also provides connectivity, using powerline communication (PLC) on a powerline 150 to IoT devices 152, 154, 156, 158 (smart lightbulb, coffee machine, radio, toaster, respectively). A second AP 135 is communicatively coupled to the central access point 110 via the powerline 150. In some implementations, the second AP 135 may be referred to as a range extender (RE) for adding wireless coverage area using similar AP configurations as the first AP 115. In FIG. 1, a refrigerator 180 is an example of an IoT device and has a wireless communication link 182 to the second AP 135.

The central access point 110, first AP 115 and second AP 135 may be referred to as network nodes in the local network because they provide connectivity for the other devices to access the local network. FIG. 1 is provided as an example of some connectivity options between the various IoT devices, client devices and network nodes, which may include wireless or wireline connections in different implementations. In FIG. 1, the washing machine 190 and the IoT devices 152, 154, 156, 158 may be referred to as endpoints in the local network because in the example of FIG. 1, they are not configured to provide network connectivity for any other devices. In FIG. 1, the washing machine 190 and the IoT devices 152, 154, 156, 158 have an endpoint role as their operating role in the local network. In some implementations, the operating role of an IoT device may be changed to take a relay role. In the relay role, the IoT device may operate as a relay node and may provide network connectivity for one or more other devices.

In FIG. 1, a refrigerator 180 may initially be operating in an endpoint role. However, a client device 170 may move to a position 172 in which it would be beneficial for the refrigerator to take on a relay role for the local network. In the relay role, the refrigerator 180 may provide a wireless coverage area and establish a wireless communication link 175 to the client device 170. The refrigerator 180 may alter its configuration so that it can use its upstream wireless communication link 182 to the second AP 135 to carry traffic to or from the client device 170. For example, the second AP 135 may route downstream traffic destined to the client device 170 via the wireless communication link 182. The refrigerator 180 may bridge the downstream traffic from wireless communication link 182 to the wireless communication link 175. In this way, both the client device 170 and the refrigerator 180 can utilize the wireless communication link 182 to access the local network.

There are a variety of ways the refrigerator 180 can provide access for the client device 170. For example, in some implementations, the refrigerator 180 may be equipped with a second wireless interface that can operate as an AP for the local network. In some other implementations, the refrigerator 180 may utilize a single wireless interface to alternate between the wireless communication link 182 and the wireless communication link 175. In yet other implementations, the refrigerator 180 may use a PLC interface (not shown) to join the local network and use a wireless interface to operate as an AP for the wireless communication link 175.

In some implementations, the use of a SON protocol may improve coordination between the IoT devices and other network nodes. Traditionally, a SON protocol may be utilized for self-configuration, self-management, self-healing or self-correcting capabilities of the SON having multiple APs. In this disclosure, a SON protocol may be extended to provide communication between the IoT devices and other network nodes (such as the APs 115, 135). The refrigerator 180 may communicate with the first AP 115 using SON protocol messages. The refrigerator 180 may indicate to the first AP 115 (or the client device 170) that the refrigerator 180 is capable of selecting a relay role. The first AP 115 (or the client device 170) may send a request to the refrigerator 180 to cause the refrigerator 180 to change to the relay role. In some implementations, a central controller may coordinate operating roles for various network nodes and IoT devices. The central controller may utilize the SON protocol to communicate regarding capabilities and role selections. In this disclosure, the SON protocol may or may not be implemented as a single protocol specification. For example, a SON protocol may be implemented by one or more daemons or software running on multiple APs, and may even be a combination of several communication techniques (possibly from different protocols) for performing automated AP procedures for on-boarding, configuration, or self-management. In some implementations, the SON protocol may be implemented using IEEE 1905 standards-compliant messages.

Figure 2:
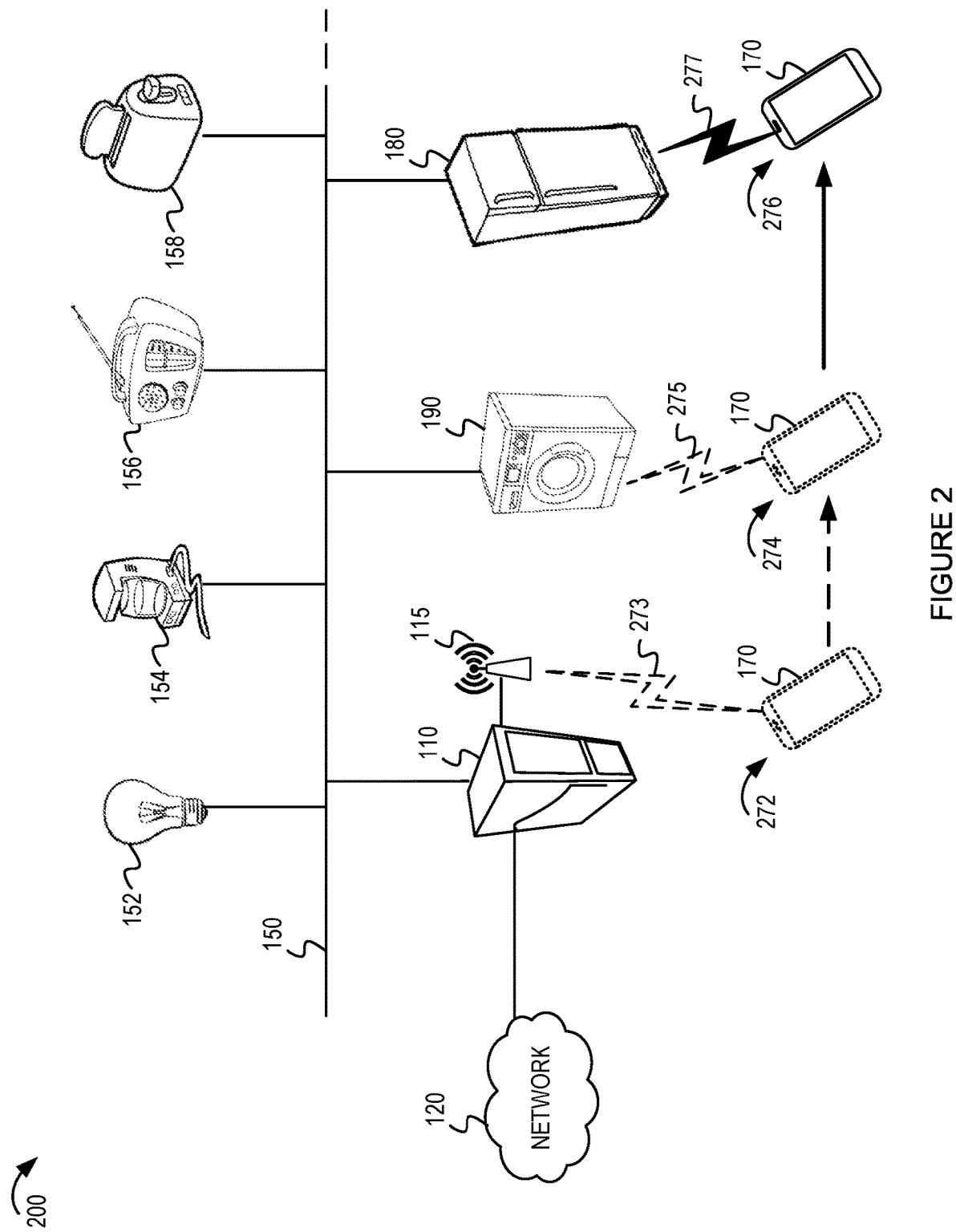
FIG. 2 shows a system diagram of an example local network in which IoT devices may dynamically select operating roles.

FIG. 2 shows a system diagram of an example local network in which IoT devices may dynamically select operating roles. The network 200 includes similar devices as described in FIG. 1. For example, the network 200 includes network nodes (the central access point 110, the first AP 115, the second AP 135), client device 170, and IoT devices 152, 154, 156, 158 coupled via the powerline 150. In FIG. 2, the refrigerator 180 and the washing machine 190 may be coupled via the powerline 150 (or via another network node, such as first AP 115 or second AP 135 (not shown)). The central access point 110 provides access to the broadband network 120.

In the example of FIG. 2, the client device 170 may be moving through the location at which the network 200 is deployed. At a first position 272, the client device 170 may have a wireless communication link 273 to the first AP 115. As the client device 170 moves to the second position 274, the signal strength of the wireless communication link 273 may decrease. The washing machine 190 may detect the client device 170 and determine that the washing machine 190 could provide a better wireless connection to the client device 170. The washing machine 190 may change from an endpoint role to a relay role in the network. In the relay role, the washing machine 190 may establish a wireless coverage area (such as an AP) for the client device 170. The client device 170 may establish a wireless communication link 275 to the washing machine 190. In some implementations, the washing machine 190 may select the relay role as a result of receiving a wireless connection request or other message from the client device 170 (or from the first AP 115).

Continuing with the example of FIG. 2, the client device 170 may continue moving through the location. Moving from the second position 274 to a third position 276, the client device 170 may experience a decrease in signal strength for the wireless communication link 275. The refrigerator 180 may receive a request or detect the presence of the client device 170 and change from an endpoint role to a relay role. In the relay role, the refrigerator 180 may establish a wireless coverage area in which the client device 170 may establish a wireless communication link 277 to the refrigerator 180. When the client device 170 is at the third position 276, the washing machine 190 may determine that it no longer is beneficial for the washing machine 190 to operate in the relay role. The washing machine 190 may change back to an endpoint role to conserve power and reduce wireless interference at the location.

Figure 3:
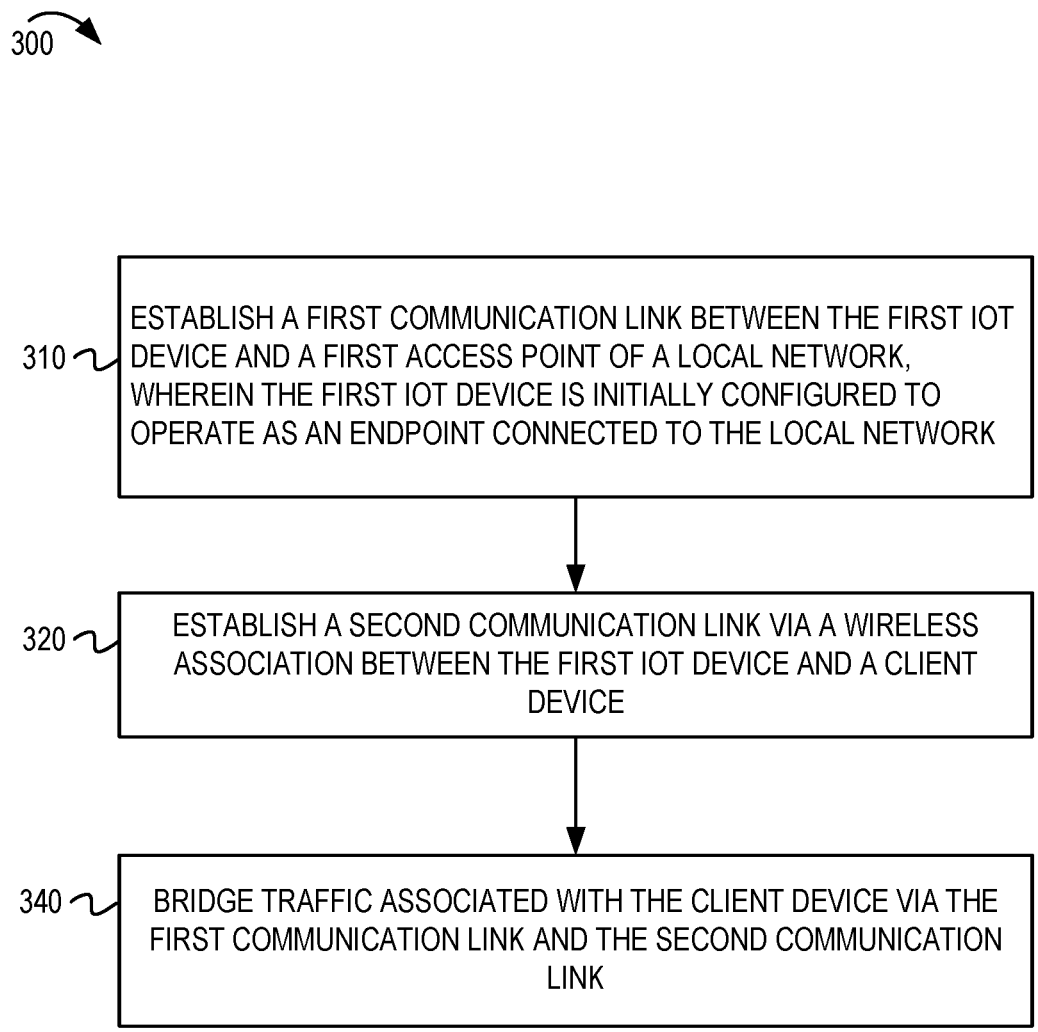
FIG. 3 shows a flowchart of an example IoT device that can bridge traffic for a client device in a local network.

FIG. 3 shows a flowchart of an example IoT device that can bridge traffic for a client device in a local network. The flowchart 300 begins at block 310. At block 310, a first IoT device may establish a first communication link between the first IoT device and a central access point of a local network. The first IoT device is initially configured for an endpoint role and may operate as an endpoint connected to the local network. The first communication link may be wireline or wireless.

At block 320, the first IoT device may establish a second communication link via a wireless association between the first IoT device and a client device. The first IoT device may select a relay role based on a determination that the relay role would enhance connectivity for a client device that is within a wireless range of the first IoT device. For example, the first IoT device may operate a wireless interface of the first IoT device as an access point. The first IoT device may broadcast its ability to serve as a relay node and receive a wireless association request from the client device. In some implementations, the client device may be a second IoT device attempting to gain access to the local network via the first IoT device.

At block 340, the first IoT device may bridge traffic associated with the client device via the first communication link and the second communication link in response to changing the configuration of the first IoT device to operate as the relay node. For example, the first IoT device may route traffic based on a media access control (MAC) address or internet protocol (IP) address associated with the client device. In some implementations, the first IoT device may change a configuration of the first IoT device to perform a relay role between the network node and the client device (rather than as an endpoint role). For example, the first IoT device may send a SON protocol message to another network node in the network to indicate that the first IoT device is providing access for the client device. In some implementations, the first IoT device may obtain the configurations of another AP in the network so that the first IoT device can duplicate or mimic at least some of the configurations. As an example, the first IoT device may use a same service set identifier (SSID) and passphrase as another AP already in the local network.

Bridging traffic may include classification, or separation, of different traffic types. For example, in some implementations, the local network may utilize traffic classification so that specific types of traffic can be routed through a particular IoT devices or via a particular virtual local area network (VLAN). For example, low latency background application traffic may be routed through the first IoT device rather than through a range extender or other AP in the network. As an example, data devices like laptops or tablets that may experience a lower link metric from a traditional range extender may benefit from connecting through the first IoT device.

Figure 4:
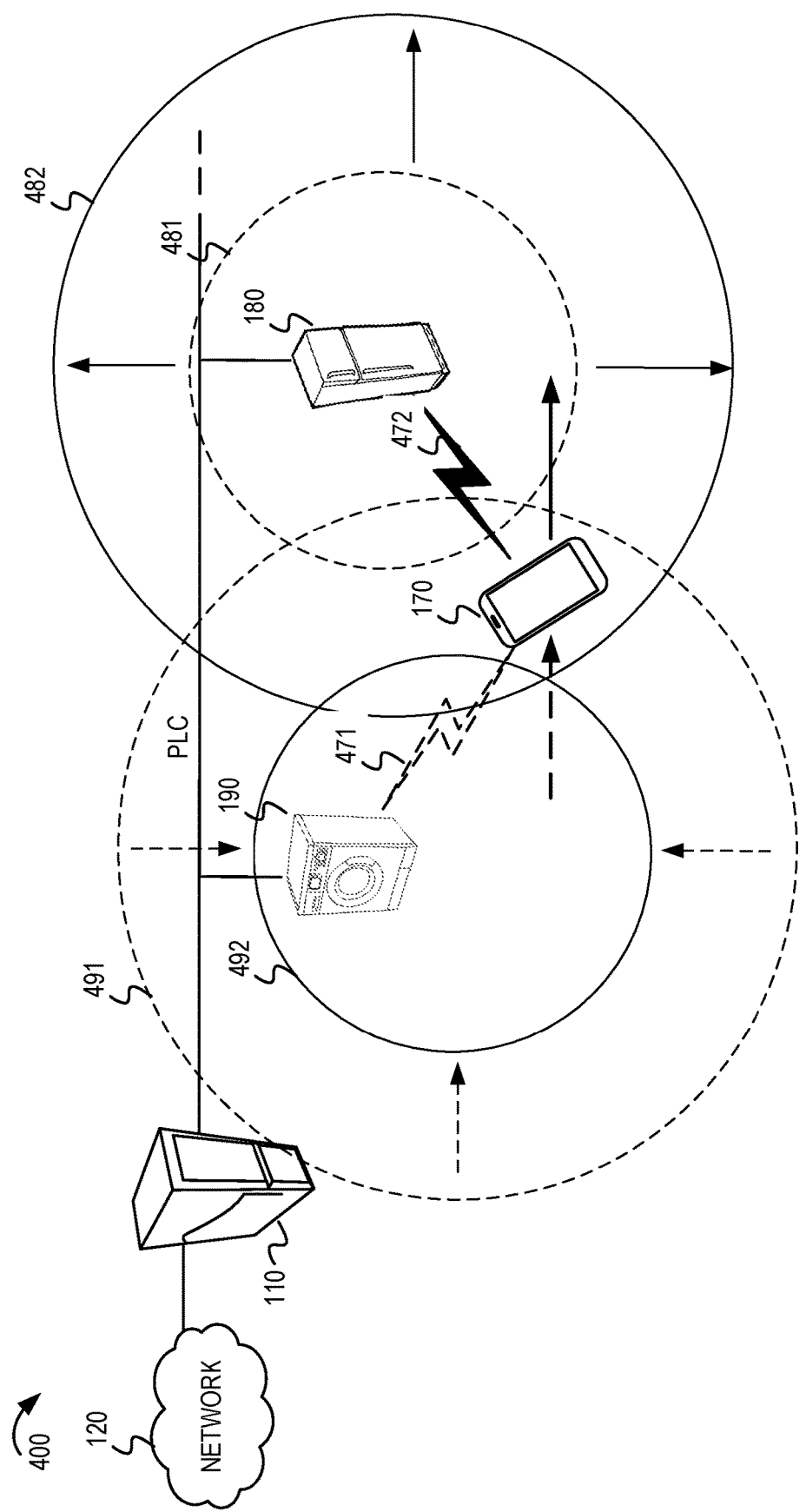
FIG. 4 shows a system diagram of an example local network showing coordination of two IoT devices.

FIG. 4 shows a system diagram of an example local network showing coordination of two IoT devices. The network 400 includes similar devices as described for network 100 of FIG. 1. For brevity, some of the elements of network 100 are removed. In the network 400, a central access point 110 couples a broadband network 120 to a PLC subnet of the local network. The PLC subnet includes the refrigerator 180 and the washing machine 190. In the network 400, both the refrigerator 180 and the washing machine 190 are capable of operating as relay nodes and can operate as APs for the client device 170. The refrigerator 180 and the washing machine 190 implement a SON protocol for coordinating between APs. The SON protocol can include information about wireless configuration, channel selection, signal strength, and steering. Steering refers to any activity which causes a client device to change a wireless association away from a first AP to a second AP. Steering also may be referred to as a re-association activity, move, transfer, relocate, transition, switch, re-position, handover, or the like. Steering does not necessarily involve physical or geographic movement of the device. However, in the example of FIG. 4, the client device 170 may be moving away from the washing machine 190 and towards the refrigerator 180. For example, the client device 170 may be held by an operator walking through a house in which the washing machine 190 and the refrigerator 180 are located.

As the client device 170 moves away from the washing machine 190 and towards the refrigerator 180, the washing machine 190 and refrigerator 180 may implement the SON protocol to communicate about the wireless coverage areas that each IoT device will provide. For example, the washing machine 190 may decrease signal power for its AP so that the wireless coverage area decreases (from 491 to 492) when the client device 170 moves close enough to join a wireless coverage area of the refrigerator 180. Similarly, the refrigerator 180 may increase signal power for its AP so that the wireless coverage area increases (from 481 to 482). The washing machine 190 and the refrigerator 180 may coordinate to steer the client device 170 to drop the previous wireless communication link 471 (to the washing machine 190) and establish the new wireless communication link 472 (to the refrigerator 180). In this way, as the client device 170 moves about the environment, the APs associated with IoT devices can modify wireless coverage areas to best serve the client device 170. The SON protocol may define messaging that is used by the IoT devices to communicate about network configurations. For example, the SON protocol may be used to communicate about wireless channels or power levels for each AP (or IoT device acting as an AP) to utilize.

In some implementations, when the client device 170 moves out of the coverage area for the washing machine 190, the washing machine 190 may determine whether any other client devices are using the coverage area (or in the vicinity) of the washing machine 190. If no other client devices are in the vicinity of the washing machine 190 or will not use the coverage area of the washing machine 190, the washing machine 190 may change its AP interface to a low power mode and revert to an endpoint in the network. The washing machine 190 may periodically announce its availability to serve as a relay node and await a wireless association request from a client device before re-enabling the coverage area and again changing to operate as a relay node.

In some implementations, a decision to steer the client device may be based on quality of service in addition to (or independently from) movement of the client device. For example, a first IoT device may determine to steer the client device from the first IoT device to a second access point in the local network based on estimated quality of service metrics. The second access point may be a second IoT device (as the example in FIG. 4) or may be another access point (not shown). The first IoT device may determine a first link metric for the first communication link between the first IoT device and a central access point of the local network. The first IoT device also may determine a second link metric for a third communication link between the second access point and the central access point. The first IoT device may steer the client device to the second access point if the first IoT device determines that the second access point would provide a higher quality of service (such as lower latency, greater throughput, or the like). for the client device based, at least in part, on a comparison of the first link metric and the second link metric.

In some implementations, application specific routing may be used in the network to route some types of traffic (such as defined by QoS requirements) though a particular IoT device. In some implementations, a particular IoT device may implement unique features using application programming interfaces (APIs) in the IoT device.

Figure 5:
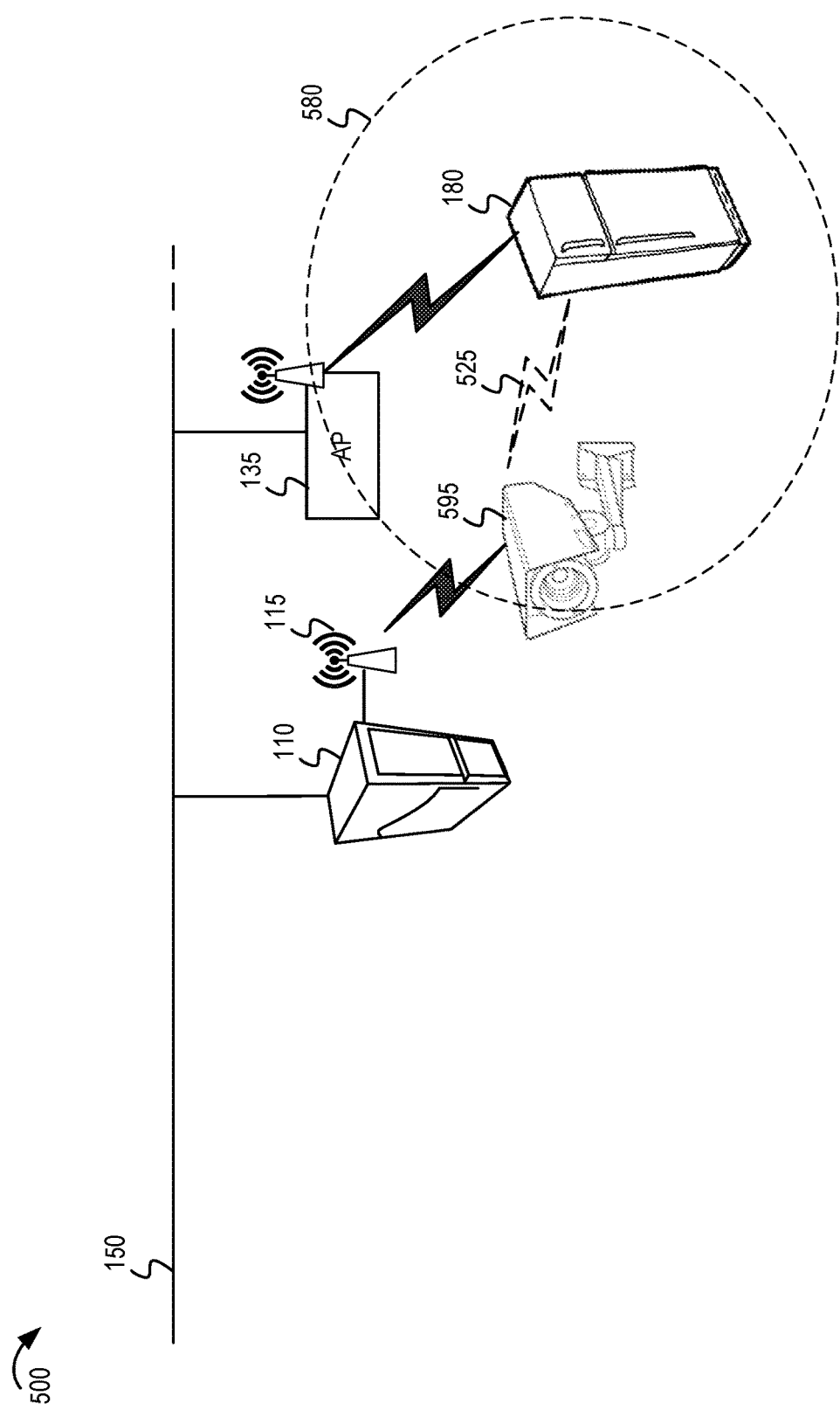
FIG. 5 shows a system diagram of an example local network in which a first IoT device can be used for diagnostic measurements.

FIG. 5 shows a system diagram of an example local network in which a first IoT device can be used for diagnostic measurements. The network 500 includes similar devices as described for network 100 of FIG. 1. For brevity, some of the elements of network 100 are removed. In the network 500, a central access point 110 couples a PLC subnet of the local network via the powerline 150. The network 500 includes a first AP 115 and a second AP 135. The first AP 115 provide wireless access to a security camera 595. The second AP 135 is providing wireless access to the refrigerator 180. Some IoT devices (such as the security camera 595) may have capabilities that are accessible from broadband network (such as "the cloud") for typical customer usage or for product diagnostics. Therefore, there may be a reason to conduct measurements regarding the wireless environment or regarding a device coupled to the network. In the example of FIG. 5, the security camera 595 may be within a wireless range 580 of the refrigerator 180. The refrigerator 180 may be capable of conducting remote access or diagnostic measurements 525 of the security camera 595. For example, the refrigerator 180 may change the operation of the refrigerator 180 to become a relay node and use the wireless range 580 to provide connectivity to the security camera 595. While the security camera 595 is accessing the network via the refrigerator 180, the refrigerator 180 may perform diagnostic functions on the security camera 595. In some implementations, the refrigerator 180 may simply scan and observe the wireless environment to obtain diagnostic information about the security camera 595. In some implementations, a service provider (such as a security system company or a cloud backup service) may utilize the remote access or diagnostic information to maintain or troubleshoot the security camera 595.

As IoT devices are deployed in home and businesses, operators of networks may utilize a first IoT device for these diagnostic functions to better understand or troubleshoot a second IoT device or another device in the network. Thus, the first IoT device can perform a diagnostic role in the network. In the diagnostic role, the first IoT device also may concurrently operate an endpoint role or a relay role for the network. Because the first IoT device can dynamically select its operating role in the network, the first IoT device may provide network edge services that otherwise might not be available on an endpoint.

Figure 6:
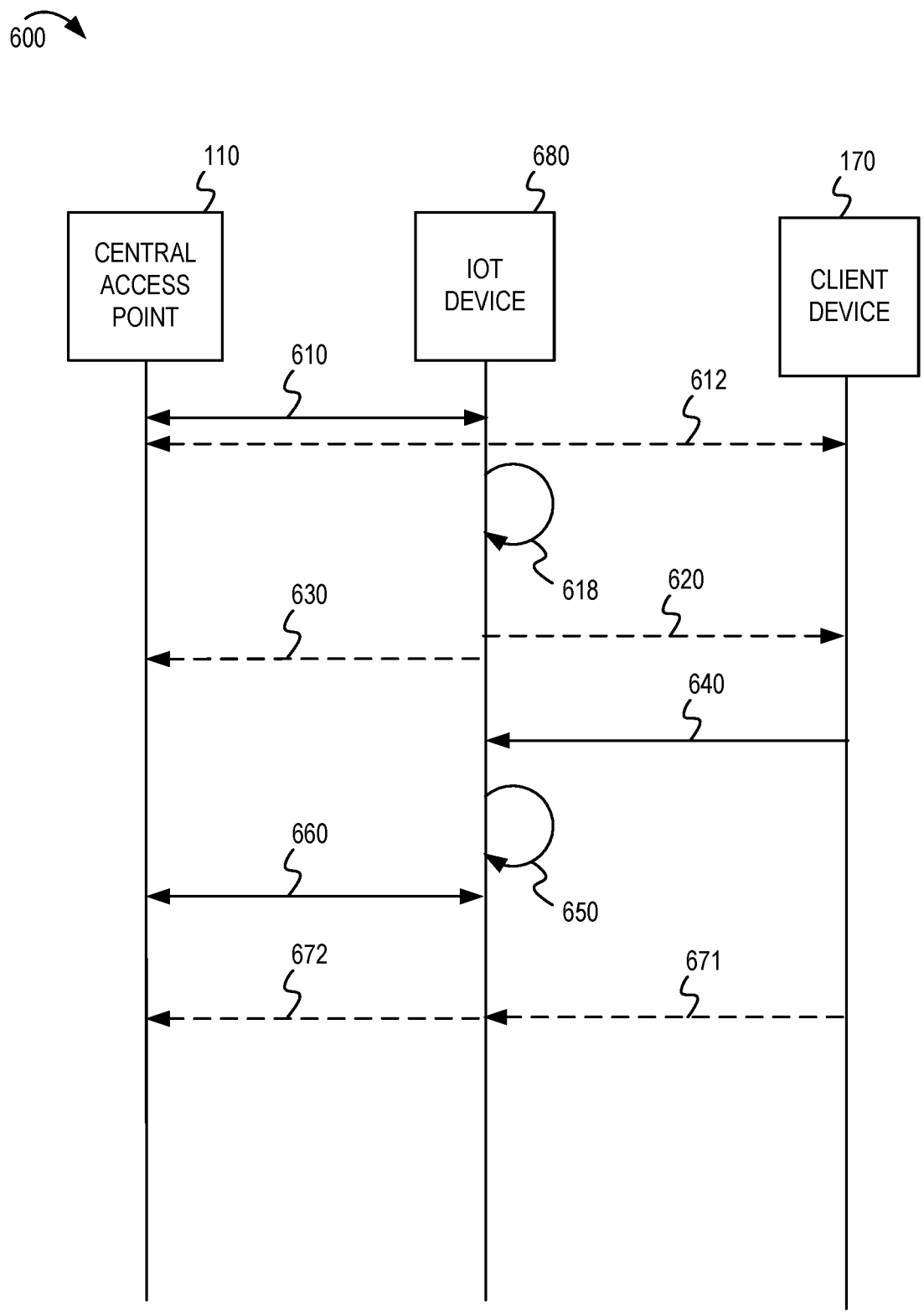
FIG. 6 shows a message flow diagram of an IoT device in an example local network.

FIG. 6 shows a message flow diagram of an IoT device in an example local network. The network 600 includes a central access point 110, an IoT device 680, and a client device 170. At 610, the IoT device 680 establishes a first communication link to the central access point 110. Initially, the IoT device 680 may be operating as an endpoint in the network 600. At 612, the client device 170 also may initially have a communication link to the central access point 110.

At 618, the IoT device 680 may "opt-in" to provide services as a relay node. For example, a push button, touch screen interface, software API, control application, or other configuration utility could be used to enable the IoT device 680 to operate as a relay node. Alternatively, the IoT device 680 may enable the services for relay node as an "on-demand" feature whenever it detects the client device 170. In some implementations, the IoT device 680 may enable the services (either as "opt-in" or "on-demand") in real-time, dynamically, based on channel loading, interference, or link metrics associated with one or more APs in the local network. For example, a SON protocol may enable the services dynamically in response to changes in the wireless environment, utilization, or locations of client devices.

At 620, the IoT device 680 may advertise its ability to serve as a relay node (performing a relay role) for the network. For example, the IoT device 680 may broadcast a message (such as a beacon message) offering to enable a wireless access point at the IoT device 680 if the IoT device 680 receives a request from the client device 170 (or any other client device in the network). In some implementations, the IoT device 680 may use an information element (IE) to advertise relay or repeater capabilities. In some implementations, an application programming interface (API) of the IoT device 680 may be used to enable the IE. At 630, the IoT device 680 also may send a message to the central access point 110 indicating that the IoT device 680 is capable of joining the SON protocol associated with the local network.

At 640, the IoT device 680 may receive a request from the client device 170 for a wireless association. At 650, the IoT device 680 may change its operating role so that the IoT device 680 will operate as a relay node between the central access point 110 and the client device 170. For example, the IoT device 680 may enable an AP interface at the IoT device 680 and accept the wireless association from the client device 170. At 660, the IoT device 680 may send an indication to the central access point 110 that the client device 170 is utilizing the IoT device 680 as a relay node. For example, the indication may be a SON protocol message or may be an address resolution protocol (ARP) message. At 671 and 672, the IoT device 680 may bridge traffic from the client device 170 to the central access point 110.

Figure 7:
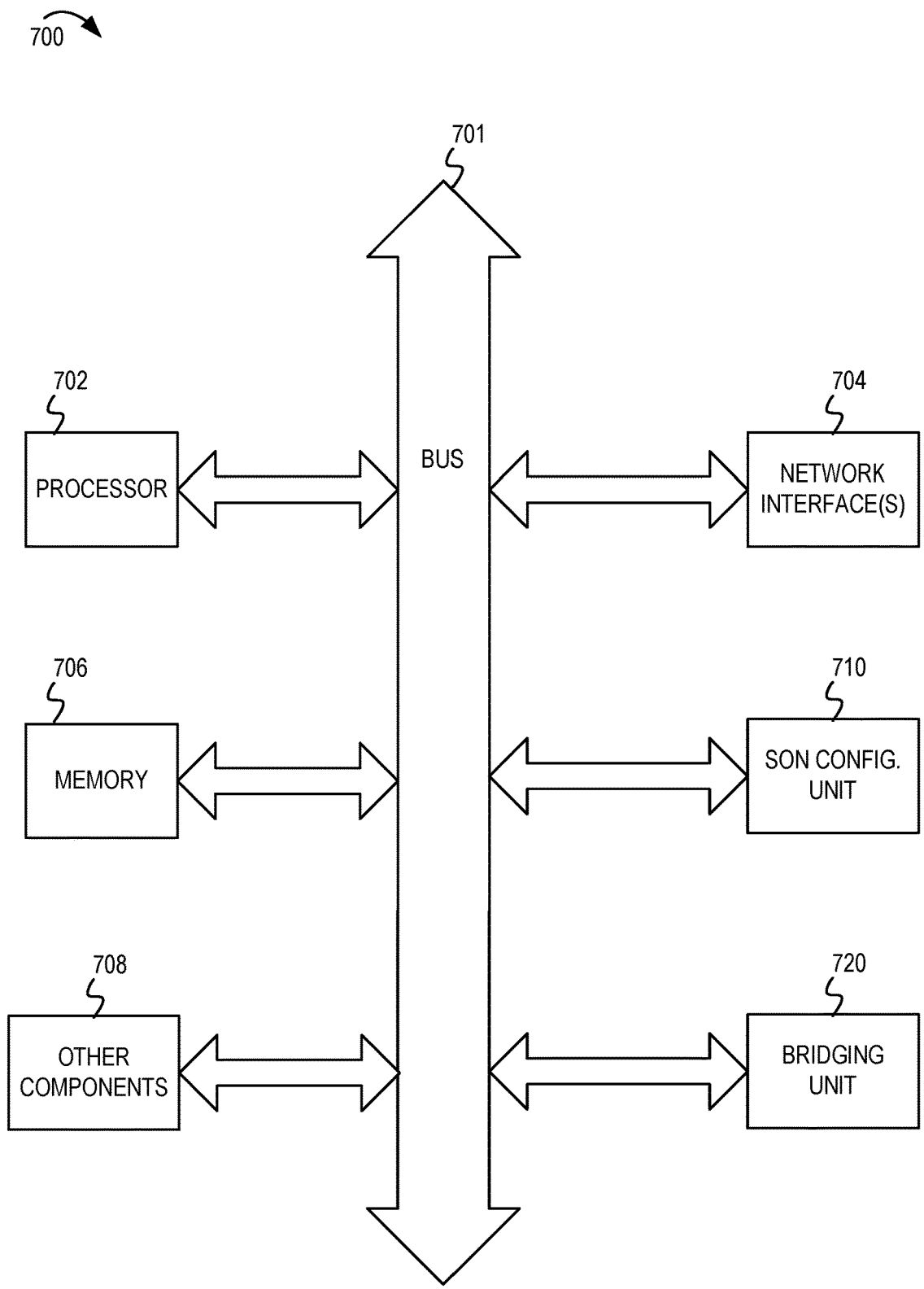
FIG. 7 shows a block diagram of an example electronic device for implementing aspects of this disclosure.

FIG. 7 shows a block diagram of an example electronic device 700 for implementing aspects of this disclosure. In some implementations, the electronic device 700 may be an IoT device (such refrigerator 180, washing machine 190, or IoT device 680). The electronic device 700 includes a processor 702 (possibly including multiple processors, multiple cores, multiple nodes, or implementing multi-threading, etc.). The electronic device 700 includes a memory 706. The memory 706 may be system memory or any one or more of the below-described possible realizations of machine-readable media. The electronic device 700 also may include a bus 701 (such as PCI, ISA, PCI-Express, HyperTransport®, InfiniBand®, NuBus, AHB, AXI, etc.). The electronic device may include one or more network interfaces 704, which may be a wireless network interface (such as a wireless local area network, WLAN, interface, a Bluetooth® interface, a WiMAX interface, a ZigBee® interface, a Wireless universal serial bus, USB, interface, or the like) or a wired network interface (such as a powerline communication interface, an Ethernet interface, etc.). In some implementations, electronic device 700 may support multiple network interfaces 704—each of which may be configured to couple the electronic device 700 to a different communication network.

The memory 706 includes functionality to support various implementations described above. The memory 706 may include one or more functionalities that facilitate implementations of this disclosure. For example, memory 706 can implement one or more aspects of refrigerator 180, washing machine 190, or IoT device 680 as described above. The memory 706 can enable implementations described in FIGS. 1-7 above. The electronic device 700 also may include other components 708. For example, the other components 708 may include data-producing or data-consuming components of the IoT device (such as sensors, user interface components, output components, or the like).

The electronic device 700 may include a SON configuration unit 710 and a bridging unit 720. The SON configuration unit 710 may operate a SON protocol that is used by the electronic device 700 to communicate with other APs in the network. The SON configuration unit 710 may determine a configuration for the network interfaces 704 based on the information collected via the SON protocol. The bridging unit 720 may provide the bridging of traffic between two or more communication links. For example, the bridging unit 720 may bridge traffic for a client device that has a communication link using the electronic device 700 for access to the local network.

Any one of these functionalities may be partially (or entirely) implemented in hardware, such as on the processor 702. For example, the functionality may be implemented with an application specific integrated circuit, in logic implemented in the processor 702, in a co-processor on a peripheral device or card, etc. Further, realizations may include fewer or additional components not illustrated in FIG. 7 (such as video cards, audio cards, additional network interfaces, peripheral devices, etc.). The processor 702, and the memory 706, may be coupled to the bus 701. Although illustrated as being coupled to the bus 701, the memory 706 may be directly coupled to the processor 702.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends on the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray™ disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine-readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for wireless communication by a first internet of things (IoT) device, comprising:
    establishing a first communication link between the first IoT device and a first access point of a wireless local area network (WLAN), the first IoT device having an operating role of an endpoint role or a relay role;
    selecting the relay role as the operating role for the first IoT device in the WLAN to serve a client device; and
    after selecting the relay role:
        operating the first IoT device as a second access point of the WLAN, wherein the second access point has a service set identifier or a passphrase of the first access point;
        increasing signal power of the second access point for a wireless coverage area associated with the first IoT device;
        establishing a second communication link via a wireless association between the first IoT device and the client device; and
        bridging traffic associated with the client device via the first communication link and the second communication link.

2. The method of claim 1, wherein selecting the relay role as the operating role comprises:
    changing the operating role of the first IoT device from the endpoint role to the relay role.

3. The method of claim 1, wherein the WLAN is a self-organizing network (SON), and wherein selecting the relay role as the operating role includes communicating with a second IoT device utilizing a SON protocol.

4. The method of claim 1, wherein selecting the relay role as the operating role for the first IoT device includes:
coordinating between the first IoT device and one or more other IoT devices in the WLAN to select the relay role for the first IoT device in accordance with a position of the client device relative to the first IoT device and the one or more other IoT devices.

5. The method of claim 1, further comprising:
determining to steer the client device from the first IoT device to a second network node in the WLAN; and
steering the client device to the second network node.

6. The method of claim 5, wherein determining to steer the client device includes:
determining a first link metric for the first communication link between the first IoT device and a central access point of the WLAN;
determining a second link metric for a third communication link between the second network node and the central access point; and
determining that the second network node would provide a higher quality of service for the client device based, at least in part, on a comparison of the first link metric and the second link metric.

7. The method of claim 1, further comprising:
reducing signal power for a wireless coverage area associated with the first IoT device.

8. The method of claim 5, further comprising, after steering the client device to the second network node:
changing the operating role of the first IoT device from the relay role to the endpoint role.

9. The method of claim 1, further comprising:
enabling a wireless interface of the first IoT device in response to a request received via the first communication link between the first IoT device and the WLAN; and
utilizing the wireless interface to obtain diagnostic measurements associated with at least one other device in the WLAN.

10. An internet of things (IoT) device for wireless communication, comprising:
one or more memories storing processor-executable code; and
one or more processors coupled with the one or more memories and individually or collectively operable to execute the code to cause the IoT device to:
establish a first communication link between the IoT device and a first access point of a wireless local area network (WLAN), the IoT device having an operating role of an endpoint role or a relay role;
select the operating role for the IoT device in the WLAN as the relay role to serve a client device; and
after selecting the relay role:
operate the IoT device as a second access point of the WLAN, wherein the second access point has a service set identifier or a passphrase of the first access point,
increase signal power of the second access point for a wireless coverage area associated with the IoT device,
establish a second communication link via a wireless association between the IoT device and the client device; and
bridge traffic associated with the client device via the first communication link and the second communication link.

11. The IoT device of claim 10, wherein, to select the relay role as the operating role, the one or more processors are individually or collectively operable to execute the code to cause the IoT device to:
change the operating role of the IoT device from the endpoint role to the relay role.

12. The IoT device of claim 10, wherein the WLAN is a self-organizing network (SON), and wherein, to select the operating role as the relay role, the one or more processors are individually or collectively operable to execute the code to cause the IoT device to communicate with a second IoT device utilizing a SON protocol.

13. The IoT device of claim 10, wherein, to select the relay role as the operating role, the one or more processors are individually or collectively operable to execute the code to cause the IoT device to:
coordinate between the IoT device and one or more other IoT devices in the WLAN to select the relay role for the IoT device based, at least in part, on a position of the client device relative to the IoT device and the one or more other IoT devices.

14. The IoT device of claim 10, wherein the one or more processors are individually or collectively further operable to execute the code to cause the IoT device to:
steer the client device from the IoT device to a second network node in the WLAN.

15. The IoT device of claim 14, wherein, to steer the client device, the one or more processors are individually or collectively operable to execute the code to cause the IoT device to:
reduce power for a wireless coverage area associated with the IoT device.

16. The IoT device of claim 14, wherein, to steer the client device, the one or more processors are individually or collectively operable to execute the code to cause the IoT device to:
increase power for a wireless coverage area associated with the IoT device.

17. The IoT device of claim 10, wherein the one or more processors are individually or collectively further operable to execute the code to cause the IoT device to:
transmit a message indicating a power level for a wireless coverage area associated with the IoT device.

18. The IoT device of claim 14, wherein the one or more processors are individually or collectively further operable to execute the code to cause the IoT device to:
receive a message indicating a network configuration associated with the second network node.

19. The IoT device of claim 10, wherein the one or more processors are individually or collectively further operable to execute the code to cause the IoT device to:
transmit, to one or more other IoT devices, a message indicating a network configuration associated with the IoT device.

20. The IoT device of claim 10, wherein the one or more processors are individually or collectively further operable to execute the code to cause the IoT device to:
obtain a first link metric for the first communication link between the IoT device and a central access point of the WLAN;
obtain a second link metric for a third communication link between a second network node and the central access point;
select the relay role when the IoT device would provide a higher quality of service for the client device in association with a comparison of the first link metric and the second link metric; and steer the client device to the second network node when the second network node would provide the higher quality of service for the client device in association with the comparison of the first link metric and the second link metric.

21. The IoT device of claim 10, wherein the one or more processors are individually or collectively further operable to execute the code to cause the IoT device to:
obtain a request to obtain diagnostic measurements associated with at least one other device in the WLAN;
utilize a wireless interface of the IoT device to obtain the diagnostic measurements associated with the request; and
provide the diagnostic measurements in response to the request.

22. The IoT device of claim 10, wherein the one or more processors are individually or collectively further operable to execute the code to cause the IoT device to:
detect the client device in proximity to the IoT device;
obtain, by the IoT device, link metrics associated with a plurality of communication links of the WLAN; and
select the relay role associated with the link metrics being indicative that the IoT device would enhance quality of service for the client device.

23. The method of claim 1, wherein a wireless interface of the first IoT device comprising a service set identifier or passphrase of an access point of the WLAN.

24. The method of claim 1, further comprising:
coordinating with a second IoT device to adapt a configuration of a wireless coverage area associated with the first IoT device.

25. The method of claim 1, further comprising:
communicating, with a second IoT device, a first wireless coverage area associated with the first IoT device and a second wireless coverage area associated with the second IoT device.

26. The method of claim 1, further comprising:
transmitting a message indicating the first IoT device is providing access for the client device.

27. The IoT device of claim 10, wherein a wireless interface of the IoT device comprising a service set identifier or passphrase of an access point of the WLAN.

28. The IoT device of claim 10, wherein the one or more processors are individually or collectively further operable to execute the code to cause the IoT device to:
coordinate with a second IoT device to adapt a configuration of a wireless coverage area associated with the first IoT device.

29. The IoT device of claim 10, wherein the one or more processors are individually or collectively further operable to execute the code to cause the IoT device to:
communicate, with a second IoT device, a first wireless coverage area associated with the first IoT device and a second wireless coverage area associated with the second IoT device.

30. The IoT device of claim 10, wherein the one or more processors are individually or collectively further operable to execute the code to cause the IoT device to:
transmit a message indicating the first IoT device is providing access for the client device.

31. A method for wireless communication by an internet of things (IoT) device, comprising:
establishing a first communication link between the IoT device and a first network node of a local network, the IoT device having an operating role of an endpoint role or a relay role;
selecting the relay role as the operating role for the IoT device in the local network to serve a client device; and
after selecting the relay role:
operating the IoT device as an access point of the local network;
establishing a second communication link via a wireless association between the IoT device and the client device;
bridging traffic associated with the client device via the first communication link and the second communication link; and
determining to steer the client device from the IoT device to a second network node in the local network, wherein determining to steer the client device includes:
determining a first link metric for the first communication link between the IoT device and a central access point of the local network;
determining a second link metric for a third communication link between the second network node and the central access point;
determining that the second network node would provide a higher quality of service for the client device based, at least in part, on a comparison of the first link metric and the second link metric; and
steering the client device to the second network node, wherein steering the client device includes dropping the first communication link.

32. An internet of things (IoT) device for wireless communication, comprising:
one or more memories storing processor-executable code; and
one or more processors coupled with the one or more memories and individually or collectively operable to execute the code to cause the IoT device to:
establish a first communication link between the IoT device and a first network node of a local network, the IoT device having an operating role of an endpoint role or a relay role;
select the relay role as the operating role for the IoT device in the local network to serve a client device; and
after selecting the relay role:
operate the IoT device as an access point of the local network;
establish a second communication link via a wireless association between the IoT device and the client device;
bridge traffic associated with the client device via the first communication link and the second communication link; and
determine to steer the client device from the IoT device to a second network node in the local network, wherein determining to steer the client device includes:
determine a first link metric for the first communication link between the IoT device and a central access point of the local network;
determine a second link metric for a third communication link between the second network node and the central access point;
determine that the second network node would provide a higher quality of service for the client device based, at least in part, on a comparison of the first link metric and the second link metric; and steer the client device to the second network node, wherein steering the client device includes dropping the first communication link.

\* \* \* \* \*